R. W. HIX.
Car Brake.

No. 30,921.  Patented Dec. 18, 1860.

Witnesses:

Inventor:
Richard Wm Hix

UNITED STATES PATENT OFFICE.

RICHARD WM. HIX, OF NEW YORK, N. Y.

RAILROAD-CAR BRAKE.

Specification of Letters Patent No. 30,921, dated December 18, 1860.

*To all whom it may concern:*

Be it known that I, RICHARD W. HIX, of New York city and county and State of New York, have invented a new and useful Mode of Operating Railroad-Car Brakes; and I do hereby declare that the following is a full, clear, and exact description thereof, reference being had to the accompanying drawings, making a part of this specification, in which—

Figure 1:
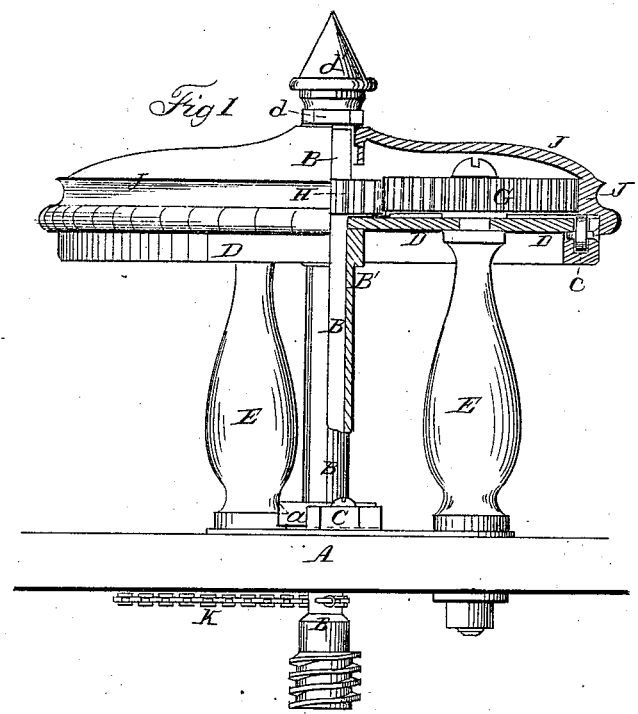
Figure 2:
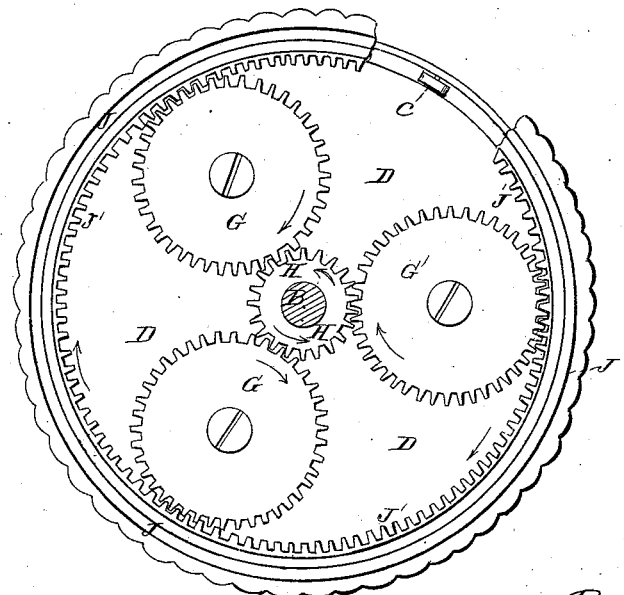

Figure 1 is a half sectional elevation of the improved mechanism employed to wind up the brake chain. Fig. 2 shows the arrangement of gearing for operating the perpendicular spindle.

Similar letters of reference indicate corresponding parts in both figures.

The object of this invention is to obtain a better control over the brakes on a railroad car, whereby they may be applied or released from the wheels with great rapidity.

The invention consists in applying to the ordinary brake shafts, instead of the hand wheel at present used, a circular box with a movable cap which box contains three or more spur wheels which have stationary bearings and which engage with the teeth of a pinion that is keyed to the brake shaft, and also with inside gearing on the movable cap so that by turning the cap the motion will be transmitted to the brake shaft, and multiplied according to the size of the central pinion; all as will be hereinafter described.

To enable those skilled in the art to fully understand my invention, I will proceed to describe its construction and operation.

In the drawings A, is supposed to be the platform at one end of the car; and B, is the brake shaft which projects perpendicularly up from the platform a suitable distance, and surrounding this shaft is a tubular shaft B', which carries a ratchet wheel $a$, on its lower end and which is keyed rigidly to the brake shaft so as to turn with it.

C is a dog or pawl pivoted to the platform and used to hold the brake shaft when the brakes are applied. This dog is worked with the foot and holds the brakes when the chain is wound up, in the usual manner.

D, is a circular plate which rests firmly on posts, E, E, that extend up from the platform A very near to the top of the brake shaft B. This plate, through the center of which the brake shaft passes, is held in a horizontal position; and at equal distances apart on its face are pivoted three spur wheels G, G, G, the teeth of which engage with the teeth of a pinion spur wheel H, that is keyed to the brake shaft B, shown clearly in Fig. 2.

J is a circular cap having inside gearing J', and a flange rim. This cap is placed over the plate D, and its teeth engage with the three wheels G, G, G. It rests on three or more friction wheels $c$, which are let into a channel that is formed around the plate D, and it is held down over the plate by a nut $d$, and cap $d'$ which are screwed over the top end of shaft B.

From this description it will be seen that by turning the cap J, motion will be transmitted to brake shaft B, through the medium of spurred gearing G, and H, which gearing will give a number of turns to the brake shaft for one turn of the cap J, and the brake chain K, may thus be wound up and the brakes applied with greater rapidity than with the hand wheels, which have hitherto been employed for this purpose.

Having thus described my invention what I claim as new and desire to secure by Letters Patent is—

The combination with the brake shaft B of the geared cap J, geared wheels G and pinion H in the manner and for the purposes herein shown and described.

RICHARD WM. HIX.

Witnesses:
L. W. BEMERE,
M. M. COMPTON.